(12) United States Patent
Fukasawa et al.

(10) Patent No.: US 7,517,132 B2
(45) Date of Patent: Apr. 14, 2009

(54) LIGHT-EMITTING AND LIGHT-RECEIVING BACKLIGHT UNIT, AND INFORMATION DEVICE USING THE LIGHT-EMITTING AND LIGHT-RECEIVING BACKLIGHT UNIT

(75) Inventors: Koichi Fukasawa, Kofu (JP); Mitsunori Ishizaka, Fujikawaguchiko-machi (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 146 days.

(21) Appl. No.: 11/430,175

(22) Filed: May 9, 2006

(65) Prior Publication Data
US 2006/0262562 A1 Nov. 23, 2006

(30) Foreign Application Priority Data
May 10, 2005 (JP) ............................ P2005-137179

(51) Int. Cl.
*F21V 7/10* (2006.01)
*H05B 37/02* (2006.01)

(52) U.S. Cl. ........................ 362/626; 362/611; 362/612; 362/630; 315/159; 349/61

(58) Field of Classification Search ................. 362/626, 362/611, 612, 630; 315/159; 349/61
See application file for complete search history.

(56) References Cited
U.S. PATENT DOCUMENTS
4,388,558 A * 6/1983 Mizuno et al. ................. 315/77

6,139,163 A * 10/2000 Satoh et al. .................. 362/612

FOREIGN PATENT DOCUMENTS
JP 2001-210120 A 8/2001
JP 2004-294310 A 10/2004

* cited by examiner

*Primary Examiner*—Ismael Negron
(74) *Attorney, Agent, or Firm*—Browdy and Neimark, P.L.L.C.

(57) ABSTRACT

A multifunctional-type backlight unit, including a light guiding plate having a first incident/exit surface and a second incident/exit surface which are capable of receiving and emitting light, a light emitting device disposed to face the first incident/exit surface and configured to supply light to the first incident/exit surface, and a light receiving device disposed to face the first incident/exit surface and configured to receive light emitted from the first incident/exit surface, the light guiding plate being configured so that the light emitted from the light emitting device enters the light guiding plate, passes through the light guiding plate, and is emitted from the second incident/exit surface, and the light guiding plate being configured so that the light which enters the second incident/exit surface, passes through the light guiding plate emits from the first incident/exit surface is received by the light receiving device.

18 Claims, 6 Drawing Sheets

LIGHT-EMITTING AND LIGHT-RECEIVING BACKLIGHT UNIT, AND INFORMATION DEVICE USING THE LIGHT-EMITTING AND LIGHT-RECEIVING BACKLIGHT UNIT

CROSS-REFERENCE TO THE RELATED APPLICATION

This application is based on and claims priority from Japanese Patent Application No. 2005-137179, filed on May 10, 2005, the disclosure of which is incorporated herein by reference in its entirety.

BACKGROUND OF THE INVENTION

1. Field of the Invention

The present invention relates to a multifunctional-type backlight unit which is configured to give an optical communication function and a solar light collection function to a backlight unit for illumination of a display, and an information device using the multifunction-type backlight unit.

2. Description of Related Art

In general, a liquid crystal panel combined with a backlight unit utilizing surface emission from a light guiding plate comprised in the backlight unit has been used as a display for a mobile phone, a personal computer, or the like. Various improvements in the backlight unit have been made.

An improved light guiding plate to accomplish uniform brightness of surface emission and a backlight unit using such a light guiding plate are already known (see, for reference, Japanese Patent Laid-Open No. 2001-210120, claims, FIG. 1).

FIG. 6A illustrates a conventional backlight unit disclosed in Japanese Patent Laid-Open No. 2001-210120.

The backlight unit includes a light guiding plate 50. The light guiding plate 50 has a generally rectangular shape and includes an incident surface 51 for light, a bottom surface 52 and an exit surface 53 for light. A plurality of grooves 54, each of which has a triangular shape in section and extends in parallel with a long side of the incident surface 51 to form a triangular prism shaoe are formed in the bottom surface 52 at predetermined intervals. A light source 55 is disposed to face the incident surface 51, and the light source 55 is covered by a light collecting plate 56 so that light emitted from the light source 55 enters the incident surface 51. In addition, a diffusing and reflecting sheet 57 is provided to face the bottom surface 52 of the light guiding plate 50.

Here, the light emitted from the light source 55 passes through the incident surface 51 and enters the light guiding plate 50 where it is reflected on the bottom surface 52 and the exit surface 53, travels in a direction (arrow A) away from the incident surface 51 in the light guiding plate 50, enters the grooves, and is refracted therein to be guided to the exit surface 53.

Next, a path of the light emitted from the light source 55 is described referring to FIG. 6B.

The light emitted from the light source 55 enters the light guiding plate 50 through the incident surface 51, travels in the direction of arrow A while undergoing repeated reflection on the bottom surface 52 and the exit surface 53, and enters the grooves 54a, 54b, 54d and 54e. The light 58a entering the groove 54a, the light 58b entering the groove 54b, the light 58d entering the groove 54d, and the light 58e entering the groove 54e are reflected on the respective grooves and guided to the exit surface 53.

Here, the grooves 54a to 54e formed in the bottom surface 52 are formed so that each of the grooves has a depth increasing in sequence from the groove 54a disposed close to the incident surface 51 to the groove 54e disposed furthest from the incident surface 51, so that, even if the intensity of the light decreases at grooves positioning away from the incident surface 51, increasing proportion of light received by the grooves positioning away from the incident surface 51 is achieved, thus allowing a uniform and intensified light to be guided to the exit surface.

Moreover, a typical information equipment such as a conventional mobile phone, laptop computer or the like provided with a data communication device has been developed, and a mobile phone including an infrared communication device as a data communication system has also been developed (see, for reference, Japanese Patent Laid-Open No. 2004-294310, claims, FIG. 1).

FIG. 7 illustrates a mobile phone including a conventional communication device and a communication system, as disclosed in Japanese Patent Laid-Open No. 2004-294310.

The mobile phone 60 includes an infrared transmitting and receiving section 62 allowing function other than a normal communication function using an antenna 61. A car navigation device 63 includes a display 64 and an infrared transmitting and receiving section 65. Consequently, a communication system using infrared rays 66 may be structured between the infrared transmitting and receiving section 62 of the mobile phone 60 and the infrared transmitting and receiving section 65 of the car navigation device 63.

Here, the mobile phone 60 stores phone number data of a destination in an inner memory thereof and transmits the phone number data to the car navigation device 63 by infrared rays 66 if required. If the received phone number data is set in the car navigation device 63 as the destination, the car navigation device 63 can guide the user to the destination.

With the above-mentioned configuration, when the user rides in a vehicle, the destination can be automatically set on the car navigation device simply by placing the mobile phone in the vicinity of the car navigation device, that can eliminate a complicated operation.

The backlight unit as disclosed in Japanese Patent Laid-Open No. 2001-210120 needs a relatively large space for installation, compared with other structural elements of an information device in which the backlight unit is installed, though the backlight unit has a single function for illuminating a liquid crystal panel or the like as a backlight.

In particular, in recent years, a mobile information device represented by a mobile phone, notebook computer or the like has been provided with advanced and sophisticated features. As a result, there is strong demand for compactness and light weigh.

To satisfy the requirement mentioned above, for example, a multifunctional-type part which can provide for a plurality of functions with a shared use of one installed component, that cannot be provided by a conventional backlight unit.

Usually, the mobile phone or the like have a communication device using infrared, as disclosed in Japanese Patent Laid-Open No. 2004-294310, utilizing an infrared communication device. The disclosed infrared communication device is limited to low power transmission, in view of the need to protect the eyes of a user or persons in the vicinity. As a result, the infrared communication device has problems of limited communication distance, resulting in communication failure of long distance. Also, there is a problem of low communication speed.

In recent years, a wireless communication device using a radio wave such as Bluetooth has been used in the field, as a wireless communication technology between information devices. However, it is difficult to achieve a wide generalization of the technology, because there are strict limitations on the output and also frequencies of the electric wave may influence on the human body, medical devices or the like. Furthermore, there are restrictions on the method of radio wave production or the like. In addition, because the number of parts assembled in the information device increases, when it is structured to contain the infrared communication device or the wireless communication device using radio waves. Consequently it may be difficult to achieve miniaturization of the information device and cost reduction.

FIG. 8 illustrates one example of a conventional charging system using a solar battery.

Reference number 43 shows a solar battery, 44 a transparent cover to protect the solar battery 43, 45 incident light entering the solar battery 43.

Here, because the incident light 45 enters the solar battery 43 in a generally perpendicular direction to the solar battery, it is required to broaden the receiving area of the solar battery 43 to obtain a large electromotive force, resulting in cost increase and sufficient space for the broadened receiving area of the solar battery.

SUMMARY OF THE INVENTION

An object of the present invention is to provide a multifunctional-type backlight unit and an information device sharing the multifunctional-type backlight unit, which have a backlight function to use light from the backlight unit for illuminating a liquid crystal panel or the like, a communication function to allow communication with an external information device through the light guiding plate, or a charging function making use of the light guiding plate and a solar battery.

To accomplish the above object, a multifunctional-type backlight unit according to one embodiment of the present invention includes a light guiding plate having a first incident/exit surface and a second incident/exit surface which are capable of inputting and outputting light, a light emitting device, for example, comprising at least one light emitting element disposed to face the first incident/exit surface and configured to supply light to the first incident/exit surface, and a light receiving device disposed in space provided between the light emitting elements to face the first incident/exit surface and configured to receive light emitted from the first incident/exit surface.

The light guiding plate is configured so that the light emitted from the light emitting device enters the light guiding plate, passes through the light guiding plate, and is emitted from the second incident/exit surface.

The light guiding plate is configured so that the light receiving device receives light which enters the second incident/exit surface, passes through the light guiding plate, and is emitted from the first incident/exit surface.

With the above-mentioned structure, it is possible to accomplish a multifunctional-type backlight unit which can be configured to allow functioning of the light emitting device disposed close to the light guiding plate as a backlight by utilizing the wide emission and acceptance surface of the light guiding plate, to achieve an optical communication function for transmitting and receiving information by way of the light emitting device and light receiving device, or to achieve a charging function making use of a solar battery.

Thereby, it is possible to achieve optical communication or receiving of solar light efficiently by utilizing the wide emission and acceptance surface of the light guiding plate even in a small-scale mobile device.

DETAILED DESCRIPTION OF THE PREFERRED EMBODIMENTS

Preferred embodiments of the present invention will be explained in detail below with reference to the accompanying drawings.

Figure 1:
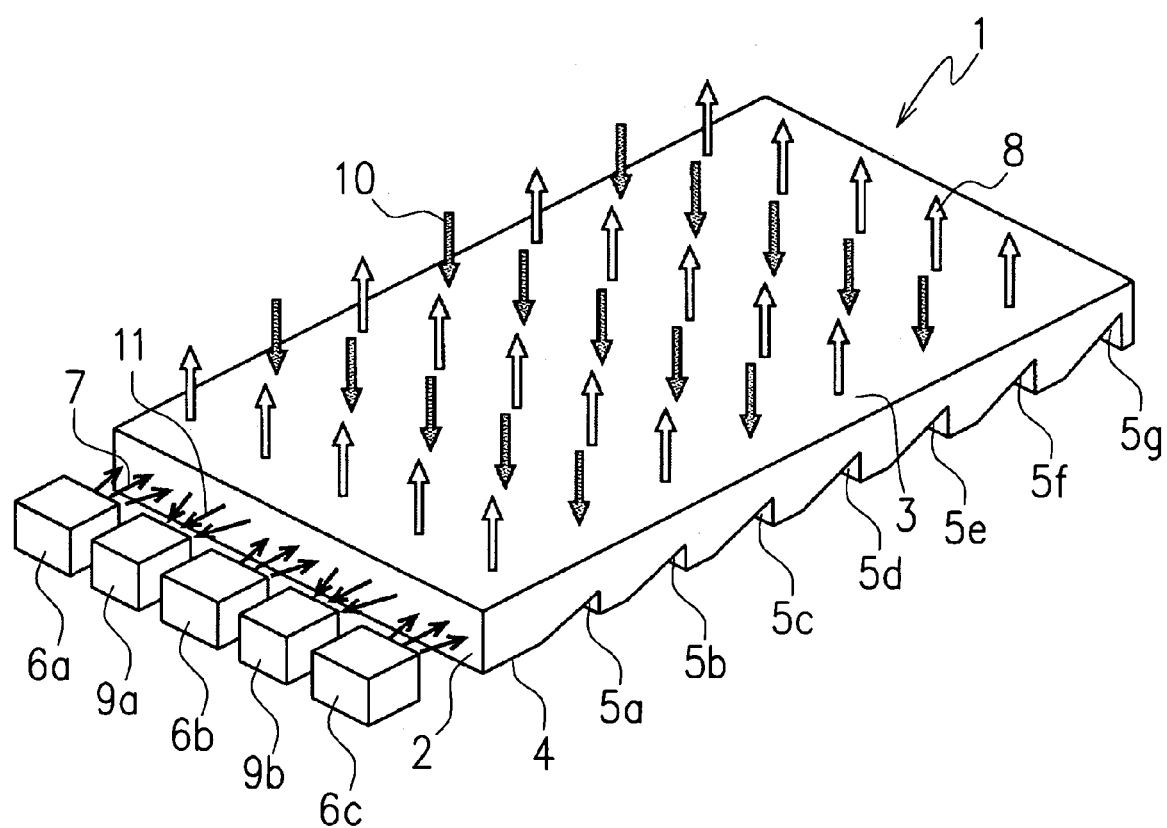
FIG. 1 is a perspective view showing a first embodiment of a multifunctional-type backlight unit according to the present invention.

FIG. 1 illustrates a first embodiment of a multifunctional-type backlight unit according to the present invention.

The multifunctional-type backlight unit includes a light guiding plate 1, a light emitting device to send light to the light guiding plate 1 and a light receiving device to receive light from the light guiding plate 1. The light guiding plate 1 has a generally rectangular shape with a predetermined thickness and can be made of any transparent material.

The light guiding plate 1 includes, for example, a first incident/exit surface 2 which is provided on one side surface of the light guiding plate 1 and is capable of inputting incident light 7 and outputting outgoing light 11, a second incident/exit surface 3 which is provided on an upper surface of the light guiding plate and is capable of inputting incident light 10 and outputting outgoing light 8, and a transmission mechanism provided on a lower surface 4 of the light guiding plate 1 and configured to transmit light from the first incident/exit surface 2 to the second incident/exit surface 3 and from the second incident/exit surface 3 to the first incident/exit surface 2.

In this embodiment, the transmission mechanism comprises, for example, a plurality of grooves 5a to 5g provided on the lower surface 4 of the light guiding plate 1 (see FIG. 1).

The grooves 5a to 5g, each of which extends in parallel with a long side of the first incident/exit surface 2 to form a triangular prism shape, and are disposed at predetermined intervals from the first incident/exit surface 2. Each of the grooves has a triangular shape in section which is cut into the bottom surface of the light guiding plate toward the second incident/exit surface 3.

It should be noted that the number of the grooves 5a to 5g is not limited to that in the illustrated embodiment, and any number of grooves may be employed. A shape of each of the grooves 5a to 5g is preferably formed so that a depth of each of the grooves increases as a distance from the first incident/exit surface 2 to each groove increases, to make it easier to reflect the incident light 7 uniformly on the grooves and to reflect light toward the second incident/exit surface 3. Alternatively, the grooves may optionally be arranged with different depths or angles of inclined surfaces.

With the above-mentioned structure, the incident light 7 entering the light guiding plate 1 through the first incident/exit surface 2 is reflected on inclined surfaces of the plurality of grooves 5a to 5g and emitted from the second incident/exit surface 3 as the outgoing light 8. Further, the incident light 10 entering the light guiding plate 1 through the second incident/exit surface 3 is reflected on the inclined surfaces of the plurality of grooves 5a to 5g and emitted from the first incident/exit surface 2 as the outgoing light 11.

The light emitting device includes at least one light source disposed to face the first incident/exit surface 2. In the illustrated embodiment, the light source comprises, for example, a plurality of light emitting diodes (hereinafter referred to as LEDs) 6a to 6c disposed at intervals alongside the first incident/exit surface 2.

In this embodiment, the LEDs 6a to 6c are configured to emit visible light. Here, the visible light emitted from the LEDs 6a to 6c enters the light guiding plate 1 through the first incident/exit surface 2 as the incident light 7, passes through the light guiding plate 1 and reflected on the inclined surfaces of the grooves, and emitted from the entire second incident/exit surface 3 as the outgoing light 8.

The light receiving device includes at least one light receiving section configured to receive light from the light guiding plate 1. In this embodiment, the light receiving section comprises a plurality of light receiving elements 9a and 9b disposed alongside the first incident/exit surface 2 to face the first incident/exit surface 2. In this embodiment, the light receiving elements comprise, for example, photodiodes. In this embodiment, one light receiving element 9a is disposed between the LEDs 6a and 6b, the other light receiving element 9b is disposed between the LEDs 6b and 6c (see FIG. 1).

Here, when the incident light 10 such as infrared rays, solar light or the like enters the second incident/exit surface 3 of the light guiding plate 1, the incident light 10 is collected in the light guiding plate 1, reflected on the inclined surfaces of the grooves 5a to 5g, and emitted from the first incident/exit surface 2 as the outgoing light 11. The photodiodes 9a and 9b receive the outgoing light 11.

It should be noted that the light receiving elements 9a and 9b in this embodiment are photodiodes, but may alternatively be solar batteries as mentioned below, or phototransistors or the like. In this embodiment, there are three LEDs 6a to 6c disposed as the light emitting device and two photodiodes 9a and 9b disposed as the light receiving device, but the numbers of LEDs and photodiodes are not limited to these. The numbers may be changed optionally depending on a size and specification of the light guiding plate 1. The arrangement and sequence of the LEDs and light receiving elements are also not limited to those in the above-mentioned embodiment.

With the above-mentioned structure, the first incident/exit surface 2 of the light guiding plate 1 has the function of inputting the light emitted from the LEDs 6a to 6c as the incident light 7 into the light guiding plate 1 and also has the function of outputting the light collected in the light guiding plate 1 as the outgoing light 11 from the light guiding plate 1. On the other hand, the second incident/exit surface 3 has the function of outputting light which passes through the light guiding plate 1, finally as the outgoing light 8 from the second incident/exit surface 3 to the exterior and also has the function of receiving the incident light 10 from the exterior into the light guiding plate 1.

Figure 3:
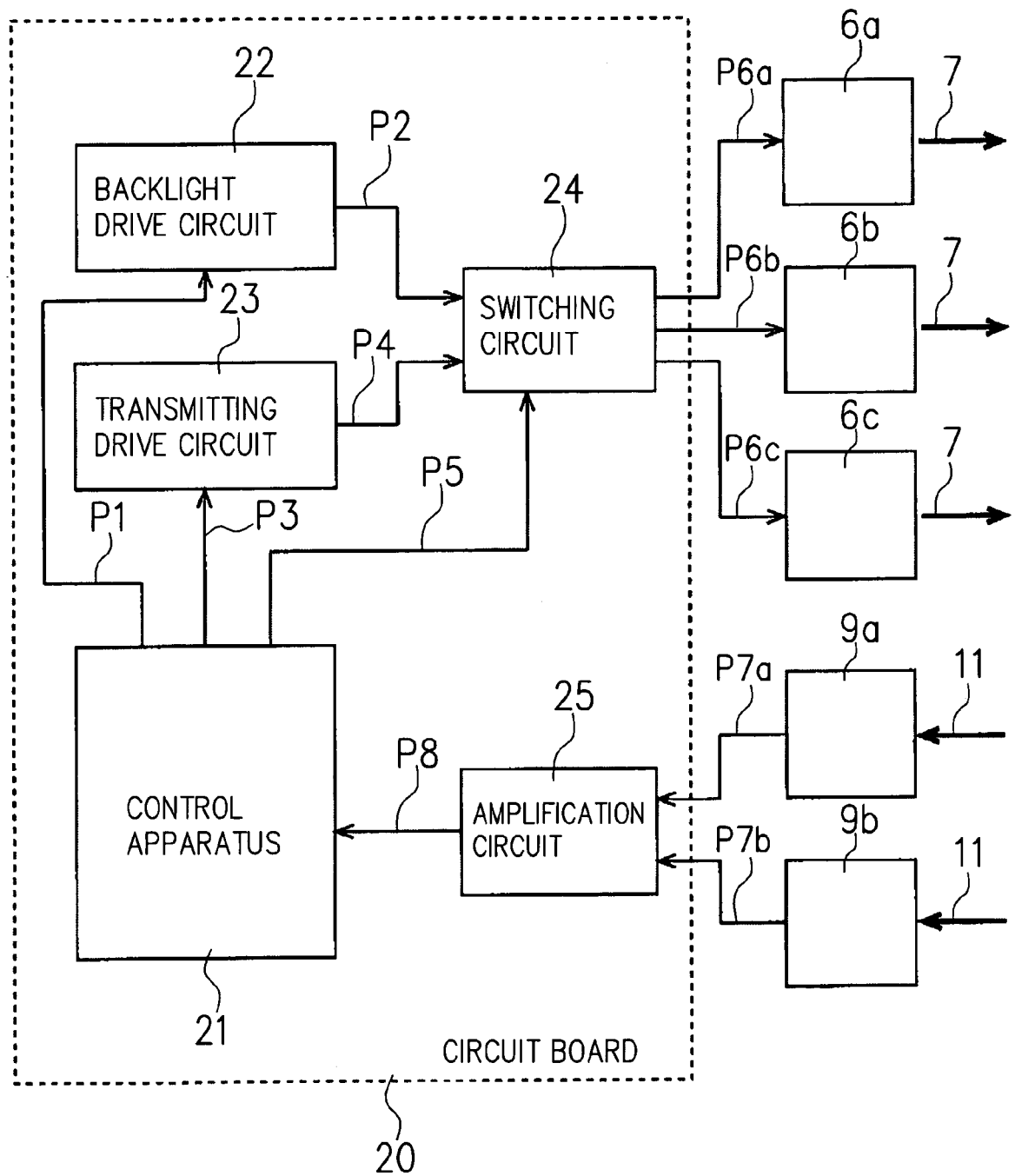
FIG. 3 is a block diagram showing the entire structure of the multifunctional-type backlight unit as shown in FIG. 1.

As shown in FIG. 3, the light emitting device includes a switching circuit 24 connected to the LEDs 6a to 6c, a backlight drive circuit 22 connected to the switching circuit 24, a transmitting drive circuit 23 connected to the switching circuit 24, and a control apparatus 21 (control circuit) connected to the switching circuit 24, the backlight drive circuit 22, and the transmitting drive circuit 23.

The light receiving device includes an amplification circuit 25 connected to the light receiving device comprising elements 9a and 9b and a control circuit. In this embodiment, the control circuit of the light receiving device employs the control apparatus 21 of the light emitting device. Consequently, the control apparatus 21 includes a program for controlling each of the light emitting device and the light receiving device.

The light receiving device is configured to receive light receiving signals P7a and P7b as input from the light receiving elements 9a and 9b, amplify the light receiving signals by way of the amplification circuit 25, and output an output signal P8 from the amplification circuit 25 to the control apparatus 21. Here, the control apparatus 21 comprises a microcomputer.

In this embodiment, the switching circuit 24, the backlight drive circuit 22, the transmitting drive circuit 23, the amplification circuit 25 and the control apparatus 21 are adapted to form an electronic circuit for both the light emitting device and the light receiving device. The electronic circuit is mounted on a circuit board 20 (see FIG. 3).

The control apparatus 21 is configured to control the multifunctional-type backlight unit according to the present invention. The backlight drive circuit 22 inputs a backlight control signal P1 from the control apparatus 21 and outputs a backlight drive signal P2 to drive the LEDs 6a, 6b and 6c as a light emitting device. The transmitting drive circuit 23 receives a transmitting control signal P3 from the control apparatus 21 and outputs a transmitting drive signal P4 to drive the LEDs 6a, 6b and 6c. The switching circuit 24 receives the backlight drive signal P2 and the transmitting drive signal P4, switches selectively between either the backlight drive signal P2 or the transmitting drive signal P4 by way of a switching signal P5 from the control apparatus 21, and outputs LED drive currents P6a to P6c.

The LEDs 6a to 6c receive the LED drive currents P6a to P6c, respectively, as input, to emit the incident light 7 toward the first incident/exit surface 2.

Figure 2A:
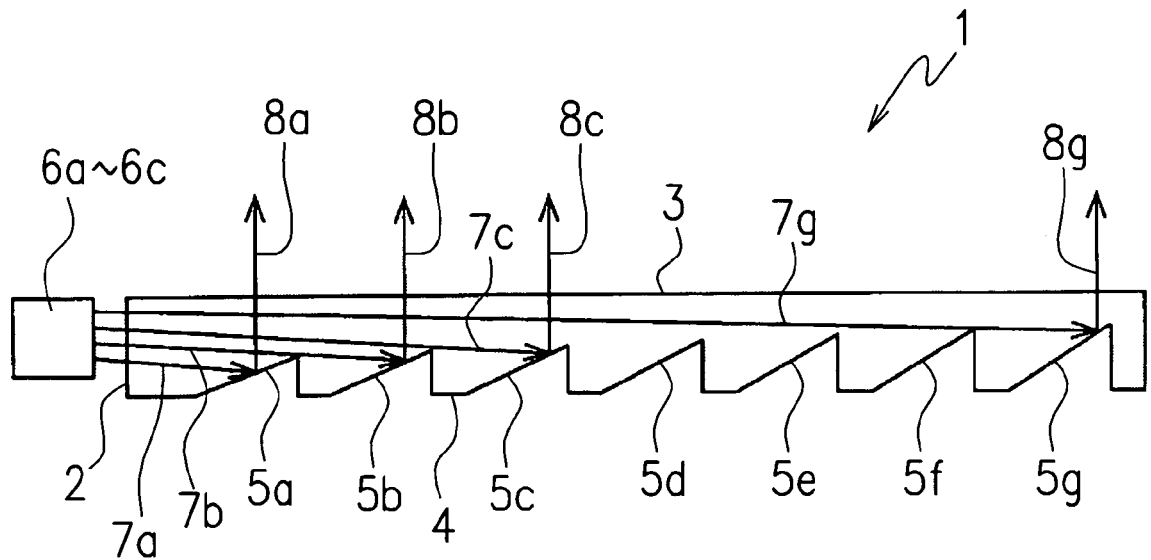
FIG. 2A is a side view for explaining operation of a light emitting device in the multifunctional-type backlight unit as shown in FIG. 1.

Next, operation of the light emitting device in the above-mentioned multifunctional-type backlight unit is described in detail referring to FIG. 2A.

The incident light 7 to the first incident/exit surface 2 emitted from the LEDs 6a to 6c is collected by a lens (not shown) provided on a light emitting surface of each LED to acquire needed directivity and is sent as input to the first incident/exit surface 2. The incident light 7 entering the first incident/exit surface 2 is reflected on each of the grooves 5a to 5g due to different incident angle thereof and is reflected on the inclined surfaces of the grooves.

In other words, as shown in FIG. 2A, a part 7a of the incident light 7 enters the groove 5a, is reflected on the inclined surface thereof and emitted from the second incident/exit surface 3 of the light guiding plate 1 as the outgoing light 8a. Another part 7b of the incident light 7 enters the groove 5b, is reflected on the inclined surface thereof and emitted from the second incident/exit surface 3 of the light guiding plate 1 as the outgoing light 8b. Still another part 7c of the incident light 7 enters the groove 5c, is reflected on the inclined surface thereof and emitted from the second incident/exit surface 3 of the light guiding plate 1 as the outgoing light 8c. Yet another part 7g of the incident light 7 enters the groove 5g, is reflected on the inclined surface thereof and emitted from the second incident/exit surface 3 of the light guiding plate 1 as the outgoing light 8g.

In the same way, the incident light 7 also enters the grooves 5d to 5f, is reflected on the inclined surfaces of the grooves, and emitted from the second incident/exit surface 3 although the optical paths are not shown in the drawings. Further, there exists incident light (not shown) emitted to the first incident/exit surface 2 from the LEDs 6a to 6c other than the incident light parts 7a to 7g, and there also exists incident light reflected on the lower surface 4 and the second incident/exit surface 3. The additional incident light is repeatedly reflected within the light guiding plate 1 and finally reflected on the inclined surfaces of the grooves 5a to 5g or lower surface 4, and emitted from the second incident/exit surface 3.

In other words, the incident light 7 emitted to the first incident/exit surface 2 from the LEDs 6a to 6c is repeatedly reflected in the light guiding plate 1 mainly by the grooves 5a to 5g of the light guiding plate 1 and is emitted from the second incident/exit surface 3 with substantially uniform brightness.

Figure 2B:
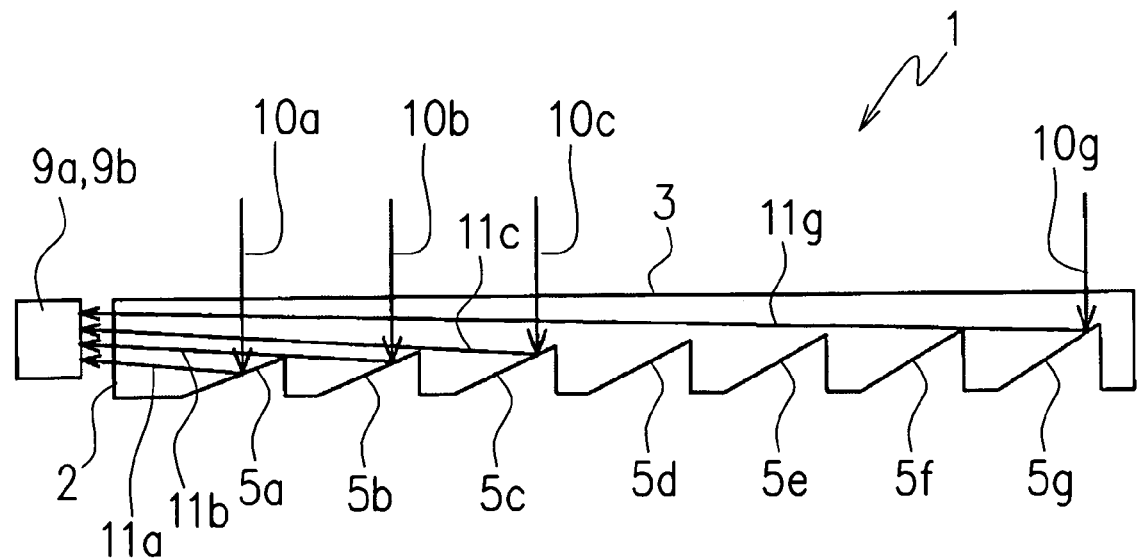
FIG. 2B is a side view for explaining operation of a light receiving device in the multifunctional-type backlight unit as shown in FIG. 1.

Next, operation of the light receiving device of the above-mentioned multifunctional-type backlight unit is described in detail, referring to FIG. 2B.

Here, it is assumed that light, for example, solar light, infrared rays,etc. from the exterior of the light guiding plate 1 enters the second incident/exit surface 3 of the light guiding plate 1 as incident light parts 10a to 10g.

That is to say, the incident light part 10a enters the groove 5a of the light guiding plate 1, is reflected on the inclined surface thereof, emitted from the first incident/exit surface 2 of the light guiding plate 1 as the outgoing light 1 la, and is received as input by the light receiving elements 9a and 9b. The incident light part 10b enters the groove 5b of the light guiding plate 1, is reflected on the inclined surface thereof, emitted from the first incident/exit surface 2 of the light guiding plate 1 as the outgoing light 11b, and is received as input by the light receiving elements 9a and 9b. The incident light part 10c enters the groove 5c of the light guiding plate 1, is reflected on the inclined surface thereof, emitted from the first incident/exit surface 2 of the light guiding plate 1 as the outgoing light 11c, and is received as input by the light receiving elements 9a and 9b. Furthermore, the incident light part 10g enters the groove 5g of the light guiding plate 1, is reflected on the inclined surface thereof, emitted from the first incident/exit surface 2 of the light guiding plate 1 as the outgoing light 11g, and is received as input by the light receiving elements 9a and 9b.

Similarly, incident light parts 10d to 10f (not shown) also enter the grooves 5d to 5f, are reflected on the inclined surfaces of the grooves, emitted from the first incident/exit surface 2, and are received as input by the light receiving elements 9a and 9b. There exists additional incident light (not shown) other than the incident light parts 10a to 10g. The additional incident light is repeatedly reflected within the light guiding plate 1 and finally emitted from the first incident/exit surface 2 as the outgoing light 11.

That is to say, the incident light 10 such as solar light, infrared rays or the like from the exterior of the light guiding plate is repeatedly reflected and collected in the light guiding plate 1 mainly by the grooves 5a to 5g of the light guiding plate 1, is emitted from the first incident/exit surface 2 as the outgoing light 11, and is received as input by the light receiving elements 9a and 9b.

Next, backlight control operation which is the basic operation of the multifunctional-type backlight unit according to the present invention is described in detail referring to FIG. 3.

The control apparatus 21 outputs the backlight control signal P1 which comprises a three-bit digital signal. The backlight drive circuit 22 receives the backlight control signal P1, executes a D/A conversion therein and outputs the backlight drive signal P2 comprising eight kinds of analogue voltages. For example, if the backlight control signal P1 is logical "0" in all three bits, the backlight drive signal P2 is zero (0) volt, and if the backlight control signal P1 is logical "1" in all three bits, the backlight drive signal P2 is the maximum three volts.

Here, the number of bits making up the backlight control signal P1 is not limited to three and may be set to any value. There is also no limit on the maximum value of the backlight drive signal P2.

Moreover, the control apparatus 21 outputs the switching signal P5 which is a one-bit digital signal of logical "0", to control the switching circuit 24. When the switching signal P5 of logical "0" is input to the switching circuit 24, the switching circuit 24 selects the backlight drive signal P2, executes a voltage/current conversion therein, and outputs the LED drive currents P6a to P6c in accordance with the backlight drive signal P2 to control the lighting of the LEDs 6a to 6c.

That is to say, if the backlight drive signal P2 is zero (0) volt, the switching circuit 24 is configured to set the LED drive currents P6a to P6c to zero (0) ampere, and the LEDs are turned off. Also, if the backlight drive signal P2 is the maximum three volts, the switching circuit 24 is configured to set the LED drive currents P6a to P6c to the maximum current, and the incident light 7 emitted to the first incident/exit surface 2 from the LEDs 6a to 6c has the maximum brightness.

Moreover, when the backlight drive signal P2 is in the range of 0 to 3 volts, the brightness of the incident light 7 emitted to the first incident/exit surface 2 from the LEDs 6a to 6c varies in accordance with the backlight drive signal P2, because the switching circuit 24 outputs each of the LED drive currents P6a to P6c with a current value depending on the voltage value of the backlight drive signal P2.

The incident light 7 enters the first incident/exit surface 2 of the light guiding plate 1, is reflected in the light guiding plate 1, and emitted from the second incident/exit surface 3 as the outgoing light 8 having a generally uniform brightness, as mentioned above.

With the above-mentioned operation, the multifunctional-type backlight unit according to the present invention can achieve the function of a backlight unit for display in which the on/ off status and brightness can be optionally changed through control of the installed control apparatus 21.

Next, transmitting operation for sending information through the multifunctional-type backlight unit according to the present invention to an external device is described referring to FIG. 3.

The control apparatus 21 is configured to add an error correction code to information to be sent to the exterior device if needed, and output the corrected signal as the transmitting control signal P3. The transmitting control signal P3 is, for example, a digital signal of eight bits. The transmitting drive circuit 23 converts the input transmitting control signal P3 into serial data and outputs the serial data as the transmitting drive signal P4. In addition, the control apparatus 21 outputs the switching signal P5 which is a one-bit digital signal of logical "1" to control the switching circuit 24. When the switching signal P5 of logical "1" is received by the switching circuit 24, the switching circuit 24 selects the transmitting drive signal P4, and outputs the LED drive currents P6a to P6c in accordance with the serial data of the transmitting drive signal P4 to control the on/ off status of the LEDs 6a to 6c at high speed.

Consequently, the visible incident light 7 emitted from the LEDs 6a to 6c is adapted to have its on/ off or lighting/non-lighting status controlled at high speed in accordance with the serial data of the transmitting drive signal P4 so that the incident light becomes light modulated by the transmitting drive signal P4.

In other words, when the serial data of the transmitting drive signal P4 are logical "1", the incident light 7 is on or in a lighting status, and when the serial data of the transmitting drive signal P4 are logical "0", the incident light 7 is off or in a non-lighting status. Here, the reversed logic of on/off status of the incident light 7 may be used.

The modulated incident light 7 enters the first incident/exit surface 2 of the light guiding plate 1, is reflected in the light guiding plate 1, and emitted from the second incident/exit surface 3 of the light guiding plate 1 as the outgoing light 8, as mentioned above.

With the above-mentioned operation, the multifunctional-type backlight unit according to the present invention makes it possible, through control of the installed control apparatus 21, to modulate the outgoing light 8 based on the information for transmitting, and have the transmission function for transmitting information by visible light to an external device (not shown).

Next, receiving operation for receiving information from an external device is described for the multifunctional-type backlight unit according to the present invention, referring to FIG. 3.

When information-based modulated light is transmitted from the external device (not shown) to the multifunctional-type backlight unit, the light is input to the light guiding plate 1 of the multifunctional-type backlight unit through the second incident/exit surface 3 as the incident light 10, is output as the outgoing light 11 from the first incident/exit surface 2, and the outgoing light 11 is then received as input by the light receiving elements 9a and 9b.

The light receiving elements 9a and 9b receive the outgoing light 11 and output the light receiving signals P7a and P7b in accordance with the intensity of the outgoing light. The amplification circuit 25 amplifies the light receiving signals P7a and P7b and outputs the output signal P8. The control apparatus 21 receives the output signal P8, executes an A/D conversion and also error correction treatment or the like if needed, demodulates the signals to receiving data and stores the receiving data in a memory (not shown).

With the above-mentioned operation, the multifunctional-type backlight unit according to the present invention is configured to collect the modulated light from an external device by way of the light guiding plate 1 and receive the light by way of the light receiving elements, thus achieving the receiving function for receiving information from the external device.

Figure 4:
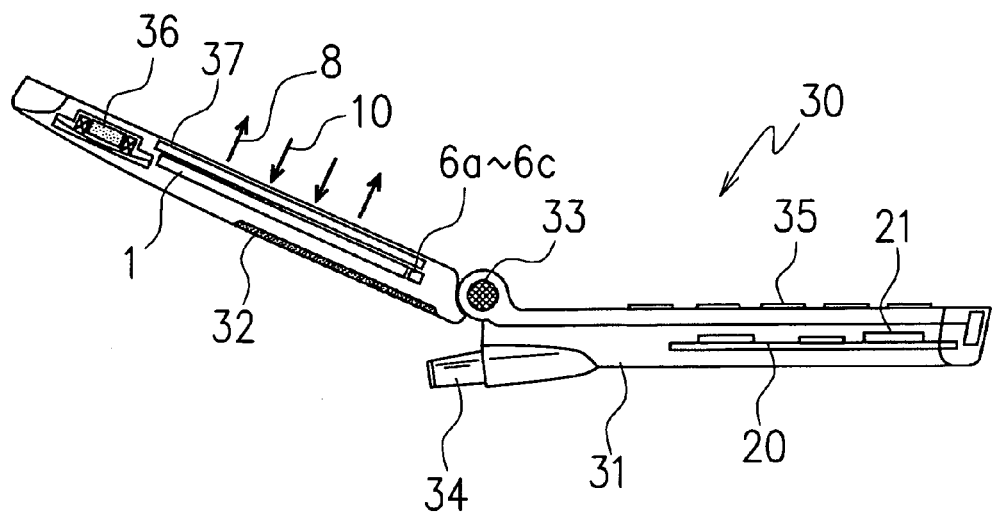
FIG. 4 is a side view of a mobile phone in which the multifunctional-type backlight unit according to the present invention is used.

Next, a structure of a mobile phone, in which the multifunctional-type backlight unit according to the present invention is used, is described in FIG. 4.

Reference number 30 shows the mobile phone as an information device according to the present invention. The mobile phone 30 includes a main body part 31 and a movable part 32 attached to the main body part 31 through a hinge 33 so that it is openable and closable. The main body part 30 includes an antenna 34 for sending and receiving electric waves, operation buttons 35, a circuit board 20 and so on.

Mounted on the circuit board 20 are the control apparatus 21 and so on which constitute the multifunctional-type backlight unit, as mentioned above. Other sending and receiving units, memory and so on (not shown) required for the mobile phone may be mounted on the circuit board 20. A speaker 36 and a liquid crystal panel 37 which acts as a display for displaying information such as phone numbers, mail and so on are provided on a surface of the movable part 32.

On a rear portion of the liquid crystal panel 37 in the movable part 32, the light guiding plate 1 and the LEDs 6a to 6c which are the main structural elements of the multifunctional-type backlight unit according to the present invention are disposed. It should be noted that the light receiving elements 9a and 9b which are disposed side by side with the LEDs 6a to 6c are not shown in FIG. 4.

Next, operation of the mobile phone 30 according to the present invention is described referring to FIG. 4.

First, when a user (not shown) of the mobile phone 30 makes a call by operating the operation buttons 35 while viewing the liquid crystal panel 37, the mobile phone 30 makes it possible, by means of the antenna 34, to execute sending and receiving of signals, to make connection with another mobile phone, and to communicate by way of the speaker 36 and a microphone (not shown). Also, the user can write and send a mail by operating the operation buttons 35 while viewing the liquid crystal panel 37.

Here, when displaying information such as phone numbers, mail or the like on the liquid crystal panel 37, the multifunctional-type backlight unit according to the present invention may illuminate the liquid crystal panel 37 as a backlight.

That is to say, the outgoing light 8 resulting from the incident light 7 emitted from the LEDs 6a to 6c is emitted from the light guiding plate 1 disposed on a rear portion or a light receiving surface of the liquid crystal panel 37 to illuminate the liquid crystal panel 37, whereby enabling to illuminate the display for various information. It should be noted that white light should preferably be used for the outgoing light 8 when the liquid crystal panel 37 displays color.

When using the mobile phone 30 to execute the transmission of information by exchanging signals with a nearby external device (not shown), the multifunctional-type backlight unit according to the present invention should be operated as a visible light communication device.

That is to say, in order to send information from the mobile phone 30 to the external device, a surface of the liquid crystal panel 37 of the mobile phone 30 is disposed close to the external device, and then the user operates the operation buttons 35 to select and execute the transmitting operation. Thereby, as mentioned above, the control apparatus 21 mounted on the circuit board 20 drives the LEDs 6a to 6c in accordance with the information to be transmitted, and the light guiding plate 1 emits the outgoing light 8 modulated in accordance with the information through the liquid crystal panel 37 to the exterior.

With the above-mentioned operation, the mobile phone 30 according to the present invention is configured to be capable of transmitting a variety of information by means of visible light modulated in response to the external device.

Similarly, when the mobile phone 30 is used to receive information from the external device, the surface of the liquid crystal panel 37 of the mobile phone 30 is disposed close to the external device (not shown), and then light modulated by transmission information is output from the external device.

It should be noted that visible light should preferably be used for the output light from the external device.

In the mobile phone 30, the light from the external device enters the light guiding plate 1 as the incident light 10 through the liquid crystal panel 37, the light receiving elements 9a and 9b (see FIG. 3) receive the outgoing light 11 collected by the light guiding plate 1, and the control apparatus 21 demodulates and stores the information received from the receiving signal of the light receiving elements 9a and 9b.

With the above-mentioned operation, the mobile phone 30 according to the present invention receives the visible light which is transmitted and modulated by the external device, and the mobile phone can thereby receive various information.

As mentioned above, according to the present invention, it is possible to accomplish a multifunctional-type backlight unit with an optical communication function, in which the light source is employed to function as a backlight for a display and information transmission can be executed by the light source and the light receiving element through the use of visible light.

In addition, by installing the multifunctional-type backlight unit according to the present invention in an information device such as a mobile phone or the like, it is possible to provide a compact, light and inexpensive information device which has a display function with a high level of visibility and a communication function of high reliability and improved convenience.

One application using an embodiment of the present invention consists of a communication system combining a mobile phone in which the multifunctional-type backlight unit is installed, and a personal computer as an external device. For example, a list of phone numbers stored in the personal computer is transmitted to the mobile phone by way of visible light through the multifunctional-type backlight unit according to the present invention.

The mobile phone receives the transmitted phone numbers, enabling automatic registration of the phone numbers.

Another application using an embodiment of the present invention consists of a photographic print system combining a mobile phone in which the multifunctional-type backlight unit according to the present invention is installed, and a printer as an external device. For example, image data photographed by a camera installed in the mobile phone are transmitted to the printer by the multifunctional-type backlight unit according to the present invention which is installed in the mobile phone and the printer receives the image data, thus allowing the image data to be printed.

It should be noted that the information device in which the multifunctional-type backlight unit according to the present invention is installed is not limited to the mobile phone, but may also be an information device for a vehicle such as a personal computer, a terminal device, a car navigation system or the like. The illustrated block diagram is not limited to the structure as shown in FIG. 3. Any structure to achieve the above-mentioned functions of the multifunctional-type backlight unit may be used. The control apparatus 21 constituting the multifunctional-type backlight unit may have a control structure to control one portion of or the whole of the information device in which it is installed.

Next, a second embodiment of the multifunctional-type backlight unit according to the present invention is described referring to FIG. 3.

In this embodiment, modulated light function is added to the multifunctional-type backlight unit.

Because a structure of the second embodiment is the same as that of the first embodiment, a description of the structure is omitted, while the operation is described referring to FIG. 3.

In FIG. 3, the control apparatus 21 outputs the backlight control signal P1 comprising a digital signal of three bits. The backlight drive circuit 22 inputs the backlight control signal P1, executes a D/A conversion therein, and outputs the backlight drive signal P2 which is analogue voltage.

Moreover, the control apparatus 21 outputs the switching signal P5 which is a one-bit digital signal of logical "0" to control the switching circuit 24. When the switching signal P5 of logical "0" is input to the switching circuit 24, the switching circuit 24 selects the backlight drive signal P2, executes a voltage/current conversion therein, and outputs the LED drive currents P6a to P6c in accordance with the backlight drive signal P2 to light the LEDs 6a to 6b.

Consequently, the multifunctional-type backlight unit in this embodiment can also achieve the backlight function.

The light guiding plate 1 shown in FIG. 1 receives light from the exterior such as solar light or infrared rays as the incident light 10 and collects it therein, as mentioned above, the light receiving elements 9a and 9b receive the light collected in the light guiding plate 1 as the outgoing light 11 and output the light receiving signals P7a and P7b. Here, the control apparatus 21 receives the output signal P8 produced by amplifying the light receiving signals P7a and P7b in the amplification circuit 25, executes A/D conversion of the output signal P8 therein, then temporarily stores the converted digital data corresponding to the intensity of the outside light.

In addition, the control apparatus 21 varies the values of the backlight control signal P1 in accordance with the stored digital data of the output signal P8 and outputs them in sequence. The backlight drive circuit 22 inputs the varied backlight control signals P1 output in sequence, outputs the backlight drive signal P2, and varies the amount of the incident light 7 emitted to the first incident/exit surface 2 from the LEDs 6a to 6c by means of the switching circuit 24.

Consequently, an embodiment of the multifunctional-type backlight unit according to the present invention is configured to adjust the emission amount of the LEDs 6a to 6c in accordance with the intensity of light from the exterior and optimize the brightness of the backlight.

For example, if the information device in which an embodiment of the multifunctional-type backlight unit according to the present invention is installed is placed in a relatively dark position in a room, the light from the exterior entering the light guiding plate 1 of the multifunctional-type backlight unit is relatively low in intensity and therefore the output signal P8 representing the intensity of the outside light is small in value. Here, the control apparatus 21 determines that from the value of the output signal P8, the light around the exterior of the information device is dark, and can adjust the backlight for optimum brightness by reducing the value of the backlight control signal P1 to lower the brightness of the backlight so that the backlight is not too bright in the dark environment.

If the information device in which the multifunctional-type backlight unit according to the present invention is installed is placed in a relatively bright outdoor position, the light from exterior entering the light guiding plate 1 of the multifunctional-type backlight unit is relatively high in intensity and therefore the output signal P8 representing the intensity of the outside light is large in value. Here, the control apparatus 21 determines that from the value of the output signal P8, the light around the exterior of the information device is bright, and can adjust the backlight for optimum brightness by increasing the value of the backlight control signal P1 to intensity the brightness of the backlight so that the contents of the display installed in the information device can be sufficiently recognized even if circumferential light from the exterior is bright.

As mentioned above, because the information device in which the multifunctional-type backlight unit is installed as shown in each of the above-mentioned embodiments can adequately adjust the brightness of the backlight in accordance with the brightness in the circumference of the display installed in the information device, it is possible to maintain the state in which it is always easy for the user to recognize the contents of the display and thus to provide the user with an information device which is easy to use. In addition, because the backlight brightness of the display is adequately adjusted, it is possible to achieve power consumption saving and provide an information device which is very convenient and has a long battery running time.

Figure 5:
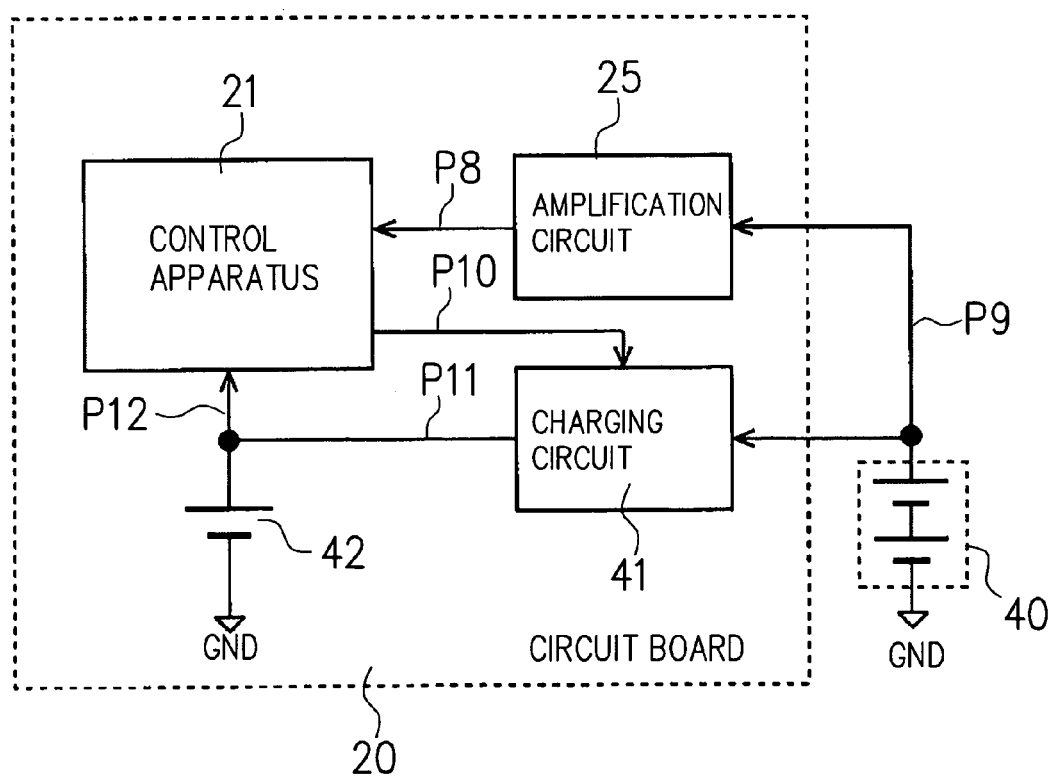
FIG. 5 is a block diagram showing a second embodiment of the multifunctional-type backlight unit according to the present invention.
Figure 6A:
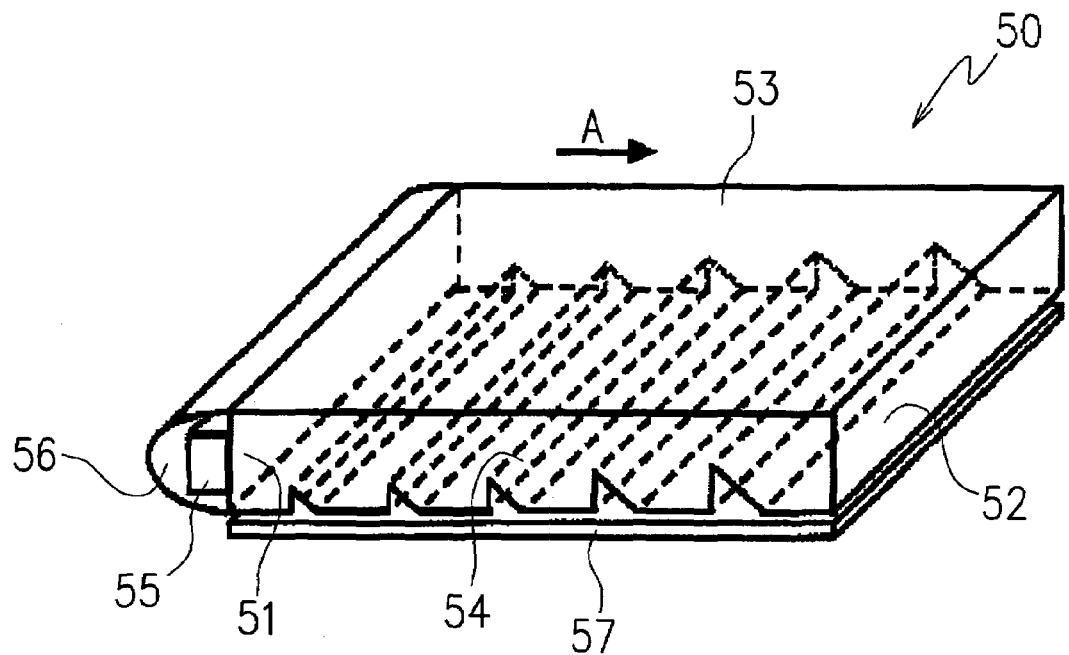
FIG. 6A is a perspective view showing a conventional backlight unit.
Figure 6B:
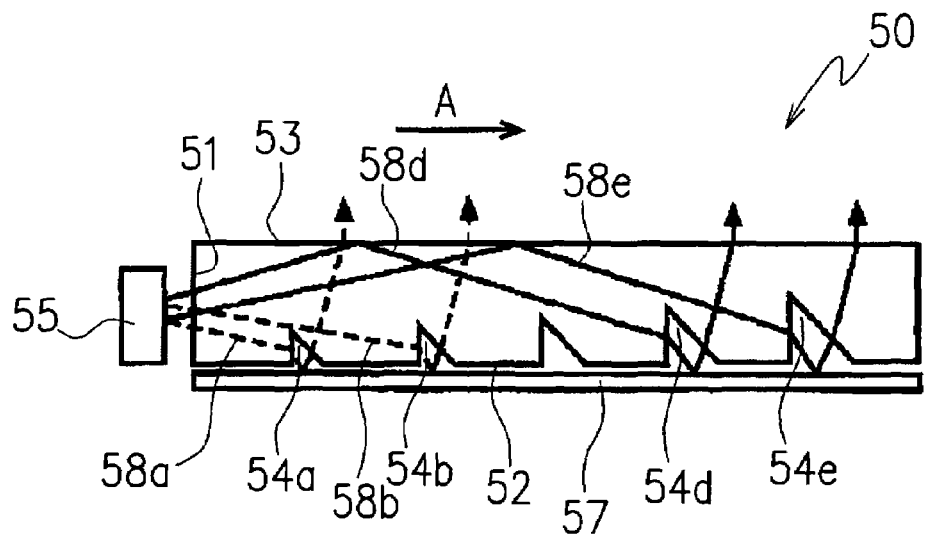
FIG. 6B is a side view showing an optical path in the conventional backlight unit shown in FIG. 6A.
Figure 7:
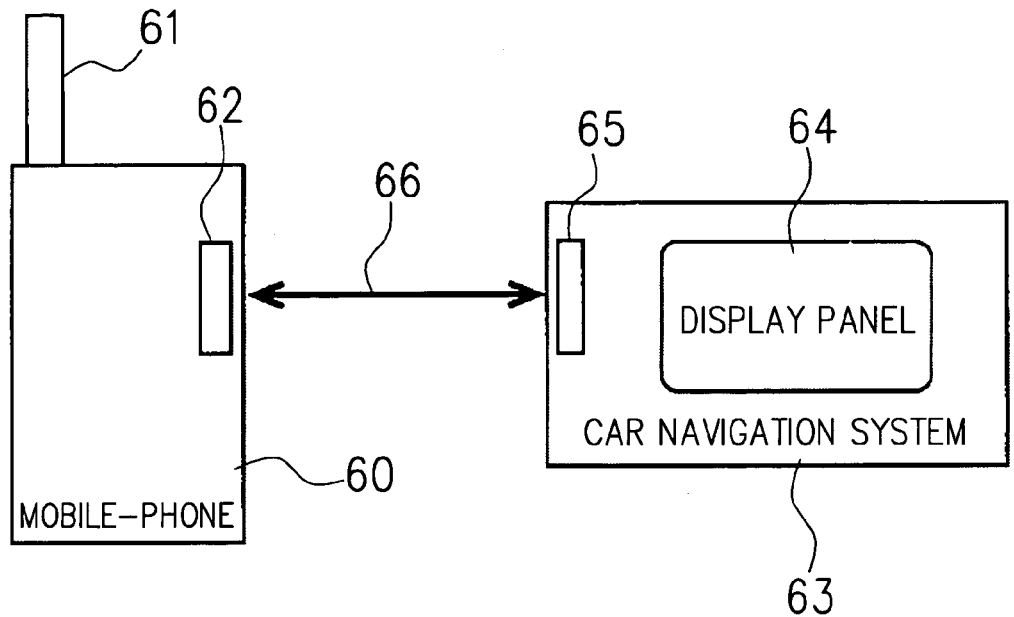
FIG. 7 is a schematic view showing a mobile phone provided with a conventional communication apparatus and a communication system using the mobile phone.
Figure 8:
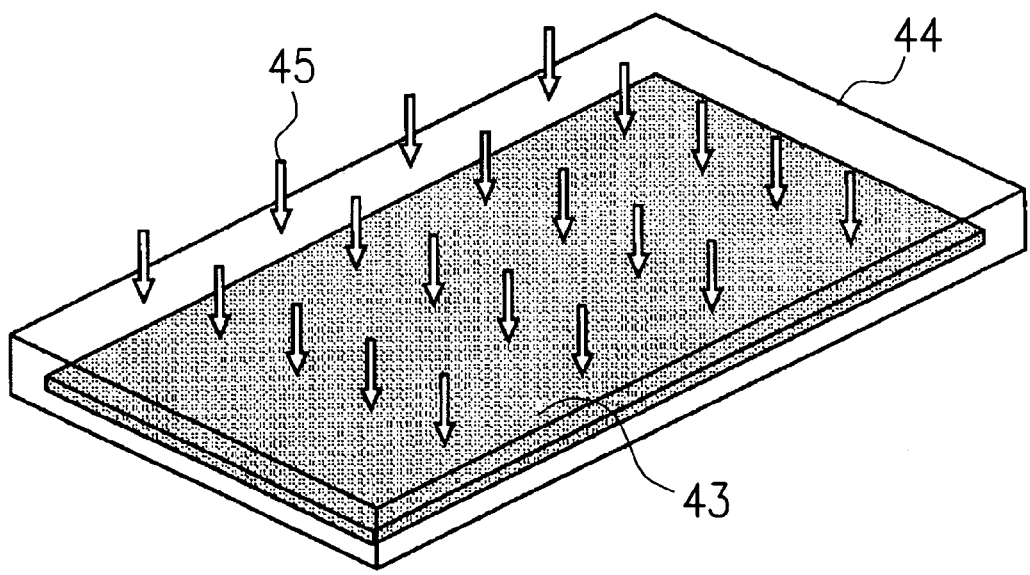
FIG. 8 is a perspective view showing one example of a conventional charging system using a solar battery.

Next, a second embodiment of the multifunctional-type backlight unit according to the present invention is described referring to FIG. 5.

The second embodiment includes a charging function for a secondary battery.

Because a part of a structure of the second embodiment overlaps with that of the first embodiment, identical reference numbers are attached to similar parts, and the overlapping description is partially omitted.

In FIG. 5, reference number 40 shows a solar battery as the light receiving element. A plus terminal of the solar battery outputs a light receiving signal P9, and a minus terminal of the solar battery is connected to GND (ground).

Reference number 41 shows a charging circuit as a charging control section. The charging circuit 41 receives the light receiving signal P9 from the solar battery 40 together with a charging control signal P10 from the control apparatus 21, and outputs a charging output signal P11.

Reference number 42 shows a secondary battery which acts as a light source of an information device in which the multifunctional-type backlight unit according to the present invention is installed. A plus terminal of the secondary battery 42 receives the charging output signal P11 and outputs a battery output P12. A minus terminal of the secondary battery 42 is connected to GND.

The amplification circuit 25 receives the light receiving signal P9 from the solar battery 40 and outputs the output signal P8. The control apparatus 21 receives the battery output P12 from the secondary battery 42 together with the output signal P8 and outputs the charging control signal P10. The battery output P12 of the secondary battery 42 is supplied not only to the control apparatus 21 but also to other circuits or the like, but they are omitted herein. The secondary battery 42 is not disposed on the circuit board 20 and may be disposed separately from the circuit board 20.

The solar battery 40 is replaced by the light receiving elements 9a and 9b as shown in FIG. 2B and disposed close to the first incident/exit surface 2 of the light guiding plate 1. If the light guiding plate has a large size, light receiving elements and solar batteries as well as light emitting elements can be disposed side by side.

Consequently, because the light guiding plate 1 receives the incident light 10 such as solar light, infrared rays or the like through the second incident/exit surface 3, collects it therein, and outputs the collected light from the first incident/exit surface 2 to the solar battery 40 as the outgoing light 11, the solar battery 40 can receive the incident light 10 such as solar light efficiently, and a great deal of electromotive force can be obtained by a small-scale solar battery.

Next, operation of the muitifunctional-type backlight unit in the second embodiment is described.

In FIG. 5, the light receiving signal P9 resulting from the electromotive force of the solar battery 40 is supplied to the secondary battery 42 through the charging circuit 41 as the charging output signal P11 and charges the secondary battery 42. The control apparatus 21 monitors the battery output P12 which is the output of the secondary battery 42 and, when the battery output P12 exceeds a predetermined voltage, outputs the charging control signal P10 to control the charging circuit 41, shuts off the charging output signal P11 and stops the charging process to prevent the secondary battery 42 from overcharging.

The output signal P8 from the amplification circuit 25 is used for the receiving function in which information is received from an external device and for the light modulation function in which the brightness of the backlight is adjusted in response to light from the exterior, but the operation of these is the same as in the first embodiment, and a description thereof is thus omitted.

The multifunctional-type backlight unit and the information device in each of the above-mentioned embodiments are configured to efficiently collect the incident light by means of the light guiding plate and efficiently receive the collected light through a solar battery of small area allowing the secondary battery to charge.

Consequently, it is possible to provide a highly functional information device containing a compact inexpensive charging system for the secondary battery and having a backlight function, or optical communication function to perform communications with an external device.

In the above-mentioned embodiments, it is also possible to provide an exclusive charging system with a high charging efficiency through the structure of an electronic circuit including a light guiding plate to collect incident light, a solar battery and secondary battery, a control apparatus and so on, but which omits the backlight function and the optical communication function for execution of optical communication with an exterior device.

Although the preferred embodiments of the present invention have been described, it should be noted that the present invention is not limited to these embodiments, and various modifications and changes can be made to the embodiments.

What is claimed is:

1. A light-emitting and light-receiving backlight unit comprising:
   a light guiding plate including a first incident/exit surface and a second incident/exit surface which are capable of inputting and outputting light;
   a light emitting device disposed to face the first incident/exit surface and configured to supply light to the first incident/exit surface; and
   a light receiving device disposed to face the first incident/exit surface and configured to receive light emitted from the first incident/exit surface,
   wherein the light guiding plate is configured to receive light emitted from the light emitting device through the first incident/exit surface, to transmit the light in the light guiding plate, and to emit the light through the second incident/exit surface; the light guiding plate is configured to receive light from outside said plate through the second incident/exit surface, to transmit the light from outside said plate in the light guiding plate and to emit the light from outside said plate through the first incident/exit surface; and the light receiving device is configured to receive the light from outside said plate through the first incident/exit surface; and wherein the light receiving device includes at least one light receiving element disposed to face the first incident/exit surface, an amplification circuit to amplify a light receiving signal from the light receiving element and a control circuit configured to receive as input an output signal from the amplification circuit.

2. The light-emitting and light-receiving backlight unit according to claim 1,
wherein the light emitting device includes at least one light source disposed to face the first incident/exit surface.

3. The light-emitting and light-receiving backlight unit according to claim 1,
wherein the first incident/exit surface is provided on one side surface of the light guiding plate,
wherein the second incident/exit surface is provided on an upper surface of the light guiding plate,
wherein a plurality of grooves, each of which has a generally triangular shape in section and extends generally in parallel with a long side of the first incident/exit surface and is cut into the light guiding plate toward the second incident/exit surface are provided on a lower surface of the light guiding plate at predetermined intervals,
wherein the light guiding plate is configured to reflect light entering the first incident/exit surface on the grooves and output the light from the second incident/exit surface, and
wherein the light guiding plate is configured to collect incident light entering the second incident/exit surface from outside by the grooves and output the light from the first incident/exit surface.

4. The light-emitting and light-receiving backlight unit according to claim 1,
wherein the light emitting device includes at least one light source and a backlight drive circuit to drive the light source as a backlight,
wherein the light source is a light emitting diode emitting visible light,
wherein the visible light emitted from the light emitting diode is controlled in response to a backlight drive signal from the backlight drive circuit,
wherein the light guiding plate is configured to output the visible light entering the first incident/exit surface as backlight from the second incident/exit surface.

5. The light-emitting and light-receiving backlight unit according to claim 1,
wherein the light emitting device includes at least one light source and a transmitting drive circuit to drive the light source as a transmitter of information,
wherein the light source is a light emitting diode emitting visible light,
wherein the visible light emitted from the light emitting diode is modulated in response to a transmitting drive signal from the transmitting drive circuit,
wherein the light guiding plate is configured to output the modulated visible light entering the first incident/exit surface as information to be sent to an external device from the second incident/exit surface.

6. The light-emitting and light-receiving backlight unit according to claim 1,
wherein the light receiving element receives light which enters the second incident/exit surface of the light guiding plate, is collected by the light guiding plate and emitted from the first incident/exit surface of the light guiding plate and outputs the light receiving signal depending on the intensity of the light entering the second incident/exit surface,
wherein the control circuit demodulates the output signal from the amplification circuit to receive information from an external device.

7. The light-emitting and light-receiving backlight unit according to claim 1,
wherein the light emitting device includes at least one light source and a backlight drive circuit to drive the light source as a backlight,
wherein the light receiving element is disposed to face the first incident/exit surface,
wherein the light receiving element receives light which enters the second incident/exit surface of the light guiding plate, is collected by the light guiding plate and emitted from the first incident/exit surface of the light guiding plate and outputs the light receiving signal, depending on the intensity of the light entering the second incident/exit surface,
wherein the control circuit is configured to control the backlight drive circuit in response to the output signal from the amplification circuit and adjust the amount of visible light emitted from the light source.

8. An information device using a light-emitting and light-receiving backlight unit, comprising:
the light-emitting and light-receiving backlight unit as recited in claim 1; and
a display;
wherein a backlight for the display is comprised of the light-emitting and light-receiving backlight unit,
wherein the light-emitting and light-receiving backlight unit is configured to execute information transmission by way of an exterior device and visible light.

9. An information device using a light-emitting and light-receiving backlight unit, comprising:
the light-emitting and light-receiving backlight unit as recited in claim 1; and
a display having a light receiving surface;
wherein the light receiving surface of the display is disposed to face a second light incident/exit surface of the light-emitting and light-receiving backlight unit,
wherein the light-emitting and light-receiving backlight unit is configured to adjust intensity of backlight for the display in response to ambient light.

10. An information device using a light-emitting and light-receiving backlight unit, comprising:
the light-emitting and light-receiving backlight unit as recited in claim 1;
a display having a light receiving surface; and
a secondary battery,
wherein the light receiving surface of the display is disposed to face a second light incident/exit surface of the light-emitting and light-receiving backlight unit,
wherein a light receiving element of the light-emitting and light-receiving backlight unit is a solar cell, and
wherein the light-emitting and light-receiving backlight unit has a charging circuit configured to charge the secondary battery using a light receiving signal from the solar cell.

11. The information device using a light-emitting and light-receiving backlight unit, according to claim 8,
wherein the information device using the light-emitting and light-receiving backlight unit is a mobile phone, a personal computer, an information terminal, or an information device for a vehicle.

12. The information device using a light-emitting and light-receiving backlight unit1 according to claim 9,
wherein the information device using the light-emitting and light-receiving backlight unit is a mobile phone, a personal computer, an information terminal, or an information device for a vehicle.

13. The information device using a light-emitting and light-receiving backlight unit, according to claim 10,
wherein the information device using the light-emitting and light-receiving backlight unit is a mobile phone, a personal computer, an information terminal, or an information device for a vehicle.

14. The light-emitting and light-receiving backlight unit according to claim 1,
wherein the light emitting device includes at least one light source, a backlight drive circuit to drive the light source as a backlight, and a transmitting drive circuit to drive the light source as a transmitter of information.

15. The light-emitting and light-receiving backlight unit according to claim 14,
wherein the light emitting device further includes a switching circuit to allow selection of drive using either the backlight drive circuit or the transmitting drive circuit.

16. The light-emitting and light-receiving backlight unit according to claim 15,
wherein the light emitting device further includes a control circuit connected to the switching circuit which is configured to switch and select drive by using either one of the backlight drive circuit and the transmitting drive circuit.

17. An information device using a light-emitting and light-receiving backlight unit, comprising:
a light-emitting and light-receiving backlight unit comprising:
a light guiding plate including a first incident/exit surface and a second incident/exit surface which are capable of inputting and outputting light;
a light emitting device disposed to face the first incident/exit surface and configured to supply light to the first incident/exit surface; and
a light receiving device disposed to face the first incident/exit surface and configured to receive light emitted from the first incident/exit surface,
wherein the light guiding plate is configured to receive light emitted from the light emitting device through the first incident/exit surface, to transmit the light in the light guiding plate, and to emit the light through the second incident/exit surface; the light guiding plate configured to receive light from outside said plate through the second incident/exit surface, to transmit the light from outside said plate in the light guiding plate and to emit the light from outside said plate through the first incident/exit surface; and the light receiving device is configured to receive the light from outside said plate through the first incident/exit surface,
a display having a light receiving surface; and
a secondary battery,
wherein the light receiving surface of the display is disposed to face a second light incident/exit surface of the light-emitting and light-receiving backlight unit,
wherein a light receiving element of the light-emitting and light-receiving backlight unit is a solar cell, and
wherein the light-emitting and light-receiving backlight unit has a charging circuit configured to charge the secondary battery using a light receiving signal from the solar cell.

18. The information device using a light-emitting and light-receiving backlight unit, according to claim 17,
wherein the information device using the light-emitting and light-receiving backlight unit is a mobile phone, a personal computer, an information terminal, or an information device for a vehicle.

* * * * *

UNITED STATES PATENT AND TRADEMARK OFFICE
CERTIFICATE OF CORRECTION

PATENT NO. : 7,517,132 B2  Page 1 of 1
APPLICATION NO. : 11/430175
DATED : April 14, 2009
INVENTOR(S) : Koichi Fukasawa It is certified that error appears in the above-identified patent and that said Letters Patent is hereby corrected as shown below:

In claim 12, column 16, line 65, delete "unit1" and insert -- unit --.

Signed and Sealed this

First Day of June, 2010

David J. Kappos
*Director of the United States Patent and Trademark Office*